US011169011B2

United States Patent
Kishiro et al.

(10) Patent No.: US 11,169,011 B2
(45) Date of Patent: Nov. 9, 2021

(54) FLUID MEASURING APPARATUS

(71) Applicant: FUJI ELECTRIC CO., LTD., Kawasaki (JP)

(72) Inventors: Masami Kishiro, Kawasaki (JP); Yasufumi Morimoto, Kawasaki (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 719 days.

(21) Appl. No.: 15/968,458

(22) Filed: May 1, 2018

(65) Prior Publication Data

US 2018/0245960 A1 Aug. 30, 2018

Related U.S. Application Data

(63) Continuation of application No. PCT/JP2017/018893, filed on May 19, 2017.

(30) Foreign Application Priority Data

May 26, 2016 (JP) .............................. JP2016-105029

(51) Int. Cl.
*G01F 1/66* (2006.01)
*G01P 5/24* (2006.01)

(52) U.S. Cl.
CPC ................ *G01F 1/668* (2013.01); *G01F 1/66* (2013.01); *G01P 5/245* (2013.01)

(58) Field of Classification Search
CPC ............. G01F 1/668; G01F 1/66; G01P 5/245
See application file for complete search history.

(56) References Cited

U.S. PATENT DOCUMENTS

2005/0055171 A1 3/2005 Freund, Jr. et al.
2006/0272417 A1* 12/2006 Zanker ..................... G01F 1/66
  73/592
2013/0294475 A1 11/2013 Derr et al.

FOREIGN PATENT DOCUMENTS

JP  S51-055276 A  5/1976
JP  S55-147312 A  11/1980
(Continued)

OTHER PUBLICATIONS

Jerker Delsing, "A New Velocity Algorithm for Sing-Around-Type Flow Meters", IEEE Transactions on Ultrasonics, Ferroelectrics and Frequency Control, ISSN 0885-3010, E-ISSN 1525-8955, vol. 34, No. 4, p. 431-436, Jul. 4, 1987.

*Primary Examiner* — Peter J Macchiarolo
*Assistant Examiner* — Anthony W Megna Fuentes
(74) *Attorney, Agent, or Firm* — Rabin & Berdo, P.C.

(57) ABSTRACT

A fluid measuring apparatus, including a pair of ultrasonic wave probes in which one is disposed more upstream than the other, a processor, and a non-transitory storage medium containing program instructions therein. The execution of the program instructions by the processor causes the fluid measuring apparatus to provide functions of a period measuring unit that measures a first propagation period during which ultrasonic wave propagates from the one ultrasonic wave probe to the other, and a second propagation period during which ultrasonic wave propagates from the other ultrasonic wave probe to the one ultrasonic wave probe, and a flow velocity measuring unit that derives a flow velocity of the fluid by cancelling errors in a first flow velocity that is derived by measuring the second propagation period after measuring the first propagation period, and a second flow velocity that is derived by measuring the first propagation period after measuring the second propagation period.

9 Claims, 7 Drawing Sheets

(56) References Cited

FOREIGN PATENT DOCUMENTS

| | | | |
|---|---|---|---|
| JP | 2001-235353 | A | 8/2001 |
| JP | 2004-93163 | A | 3/2004 |
| JP | 2012-216412 | A | 11/2012 |
| JP | 5326697 | B2 | 10/2013 |

* cited by examiner

FLUID MEASURING APPARATUS

CROSS-REFERENCE TO RELATED APPLICATION

This application is a continuation application of International Application PCT/JP2017/018893, filed on May 19, 2017, which claims priority to Japanese Patent Application No. 2016-105029, filed on May 26, 2016, the entire contents of which are incorporated herein by reference.

BACKGROUND OF THE INVENTION

1. Field of the Invention

The present invention relates to a fluid measuring apparatus measuring flow velocity and/or flow rate of fluid using ultrasonic wave.

2. Description of the Related Art

Generally, a propagation period difference method is known as a method for measuring flow velocity and/or flow rate of fluid using ultrasonic wave (see Japanese Patent No. 5326697, for example). The method utilizes phenomenon in which when ultrasonic waves in one direction along flow of fluid and the other direction against the flow of the fluid are transmitted and received, difference in propagation periods of the ultrasonic waves in the two directions varies depending on flow velocity of the fluid. One technique is disclosed in Japanese Patent No. 5326697, in which ultrasonic waves are transmitted and received a plurality of times and then synchronous averaging is applied to the measured waveforms thereof, thereby enhancing S/N ratio (Signal to Noise ratio).

BRIEF SUMMARY OF THE INVENTION

In the propagation period difference method, speed of sound in ultrasonic wave is not constant, varying owing to affect relating to other physical quantities such as temperature and so on. Therefore, there is a problem that when trying to enhance S/N ratio by measuring a plurality of times propagation period of ultrasonic wave propagating fluid using the propagation period difference method, temperature variation affects as long as measurement period is prolonged, thereby measurement error increasing.

The present invention provides fluid measuring apparatus in which flow velocity of fluid can be measured with high precision even if speed of sound in fluid varies.

A fluid measuring apparatus of the present invention includes: at least one pair of ultrasonic wave transmitting and receiving means which transmits and receives ultrasonic wave to and from a fluid flowing in a pipe; a period measuring unit which measures the propagation period of ultrasonic wave transmitted and received by the ultrasonic wave transmitting and receiving means; and a flow velocity measuring unit which derives flow velocity of the fluid from the propagation period of ultrasonic wave measured by the period measuring unit; wherein: one of the pair of ultrasonic wave transmitting and receiving means is disposed in upstream of the pipe, and the other is disposed in downstream of the pipe; the period measuring unit measures a first propagation period during which ultrasonic wave propagates from the ultrasonic wave transmitting and receiving means in an upstream side to the ultrasonic wave transmitting and receiving means in a downstream side, and a second propagation period during which ultrasonic wave propagates from the ultrasonic wave transmitting and receiving means in the downstream side to the ultrasonic wave transmitting and receiving means in the upstream side; and the flow velocity measuring unit derives flow velocity of the fluid so as to cancel errors using flow velocity Va which is derived by measuring the second propagation period after measuring the first propagation period, and flow velocity Vb which is derived by measuring the first propagation period after measuring the second propagation period.

According to this arrangement, even if an error occurs in a result of measurement of flow velocity of the fluid owing to variation in speed of sound in the fluid, to measure the flow velocity Va and the flow velocity Vb with changing the order in which propagation periods are measured, allows sign of the error occurring in the flow velocity Va to be opposed to sign of the error occurring in the flow velocity Vb. This allows these errors to be canceled using the flow velocity Va and the flow velocity Vb, so as to allow S/N ratio to be enhanced by measuring the propagation period of ultrasonic wave a plurality of times, thereby measuring flow velocity of the fluid with high precision.

According to the invention, flow velocity of fluid can be measured with high precision even if speed of sound in fluid varies.

DETAILED DESCRIPTION OF THE INVENTION

Figure 1:
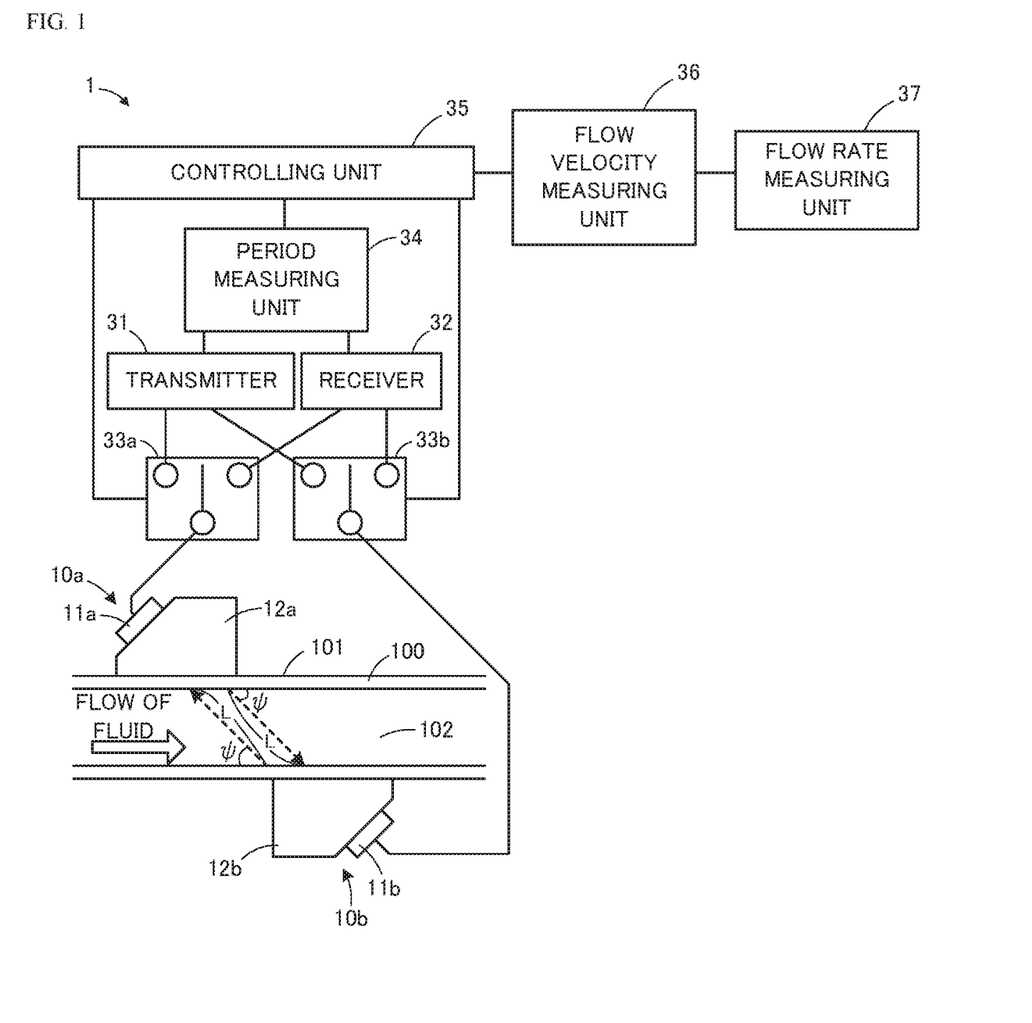
FIG. 1 is a schematic configuration view of the fluid measuring apparatus according to one embodiment.

The fluid measuring apparatus according to one embodiment of the invention is described in detail below. FIG. 1 is the schematic configuration view of the fluid measuring apparatus of the embodiment.

The fluid measuring apparatus 1 measures, using ultrasonic wave, flow velocity of the fluid 102 which is flowing in the pipe 100. In the pipe 100, the one pair of ultrasonic wave probes 10a and 10b as a pair of ultrasonic wave transmitting and receiving means is arranged so that the probes face each other in diagonal direction to the flow of the fluid 102 in the pipe 100. The ultrasonic wave probes 10a and 10b are disposed in upstream and downstream sides of the flow of the fluid 102 in the pipe 100, respectively. The ultrasonic wave probes 10a and 10b include the wedges 12a and 12b which are attached to the pipe 100 as well as the ultrasonic transducers 11a and 11b which apply ultrasonic wave to the wedges 12a and 12b, respectively.

The ultrasonic transducer 11a is coupled to the transmitter 31 and the receiver 32 via the switch 33a, while the ultrasonic transducer 11b is coupled to the transmitter 31 and the receiver 32 via the switch 33b. The switches 33a and 33b switch connecting ends of the ultrasonic wave probes 10a and 10b, to between their respective ones of the transmitter 31 and receiver 32, thereby switching operation of the pair of ultrasonic wave probes 10a and 10b between transmitting and receiving operations.

The transmitter 31 which is coupled to the period measuring unit 34, outputs drive signal to the ultrasonic transducer 11a, 11b based on instruction from the period measuring unit 34. The receiver 32 which is coupled to the period measuring unit 34, outputs electrical signal input to the ultrasonic transducer 11a, 11b, to the period measuring unit 34.

The period measuring unit 34 measures the propagation period from time at which drive signal is output from the transmitter 31, to time at which electrical signal is input from the receiver 32. Both of the switches 33a and 33b are coupled to the controlling unit 35, and the switches 33a and 33b are switched in response to signal from the controlling unit 35, to reverse relation of transmitting and receiving between the ultrasonic wave probes 10a and 10b.

The fluid measuring apparatus 1 applies drive signal (electric current) corresponding to waveform of ultrasonic wave from the transmitter 31 via the switch 33a to the ultrasonic transducer 11a in accordance with instruction from the period measuring unit 34, to cause the ultrasonic transducer 11a to generate ultrasonic wave. The ultrasonic wave penetrates the wedge 12a and the wall surface 101 and enters the fluid 102 in the pipe 100 at a predetermined angle $\psi$. The ultrasonic wave which enters inside of the pipe 100 propagates along the flow of the fluid 102 to the ultrasonic wave probe 10b facing the ultrasonic wave probe 10a. The ultrasonic wave which propagates to the ultrasonic wave probe 10b is converted into electrical signal by the ultrasonic transducer 11b to be input to the receiver 32 via the switch 33b. As a result, the period measuring unit 34 measures the propagation period Tf of the ultrasonic wave from the ultrasonic wave probe 10a in the upstream side to the ultrasonic wave probe 10b in the downstream side.

When switching operations of the ultrasonic wave probes 10a and 10b so as to reverse them, drive signal from the transmitter 31 is also applied to the ultrasonic transducer 11b via the switch 33b to cause the ultrasonic transducer 11b to generate ultrasonic wave. The ultrasonic wave penetrates the wedge 12b and the wall surface 101 and enters the fluid 102 in the pipe 100 at a predetermined angle $\psi$ and then propagates to the ultrasonic wave probe 10a. The ultrasonic wave which inputs to the ultrasonic transducer 11a is converted into electrical signal and is input to the receiver 32 via the switch 33a. As a result, the period measuring unit 34 measures a propagation period Tr of the ultrasonic wave from the ultrasonic wave probe 10b in the downstream side to the ultrasonic wave probe 10a in the upstream side.

The flow velocity measuring unit 36 is coupled to the period measuring unit 34 via the controlling unit 35. The flow rate measuring unit 37 is coupled to the flow velocity measuring unit 36. The flow velocity measuring unit 36 calculates flow velocity of the fluid 102 based on the propagation period Tf, Tr of ultrasonic wave. The flow rate measuring unit 37 calculates flow rate of the fluid 102 based on the flow velocity of the fluid 102 derived by the flow velocity measuring unit 36. A high-frequency component of the flow velocity of the fluid 102 derived by the flow velocity measuring unit 36 may be eliminated such as by performing damping process as discussed below in an elimination processing unit (not shown). This allows result of measurement to be stabilized and error in result of measurement of flow velocity of the fluid 102 to be reduced.

In addition, the period measuring unit 34, the controlling unit 35, the flow velocity measuring unit 36 and the flow rate measuring unit 37 are configured with a processor and/or a memory and/or the like to perform various processing. The memory is configured with one or more storage media including, for example, ROM (Read Only Memory) and RAM (Random Access Memory), depending on application. The period measuring unit 34 may be configured with a period measuring circuit, a period measure, a period measuring device or the like. The controlling unit 35 may be configured with a control circuit, a controller, a control device or the like. The flow velocity measuring unit 36 may be configured with a flow velocity measuring circuit, a flow velocity measure, a flow velocity measuring device or the like. The flow rate measuring unit 37 may be configured with a flow rate measuring circuit, a flow rate measure, a flow rate measuring device or the like.

A general method to calculate flow velocity V and flow rate Q of the fluid 102 is now described. It is known that propagation periods Tr and Tf are expressed using flow velocity V of the fluid 102, speed C of sound in the fluid 102, propagation path length L of ultrasonic wave from the ultrasonic wave probe 10a to the ultrasonic wave probe 10b, and angle $\psi$ of propagation direction of ultrasonic wave in relation to flow direction of the fluid 102, as follows:

$$Tf = L/(C + V \cos \psi) \qquad (1)$$

$$Tr = L/(C - V \cos \psi) \qquad (2)$$

Solving for flow velocity V of the fluid 102 using Equations (1) and (2), Equation (3) is presented:

$$V = L/2 \cos \psi * ((1/Tf) - (1/Tr)) \qquad (3)$$

Using flow velocity V of the fluid 102 and cross-section area A of the pipe 100, flow rate Q of the fluid is expressed as Equation (4):

$$Q = V * A \qquad (4)$$

Using inner diameter D of the pipe 100, Cross-section area A of the pipe 100 is expressed as Equation (5):

$$A = (D/2)^2 * \pi \qquad (5)$$

Here, the propagation period Tf or Tr is measured sequentially a plurality of times to apply synchronous averaging to measured waveforms, allowing S/N ratio to be enhanced to improve measurement accuracy.

However, it is assumed that for flow velocity V of the fluid 102 expressed from Equations (1) to (3), speed C of sound in the fluid 102 is constant. Speed C of sound in the fluid 102 is known to vary such as depending on temperature of the fluid 102 actually. In this case, in relation to speed C of sound in the fluid 102 when measuring the propagation period Tf, speed of sound in the fluid 102 when measuring the propagation period Tr' involving variation in speed of sound, varies to C+ΔC. In this case, the propagation period Tr' is expressed as Equation (6):

$$Tr' = L/(C + \Delta C - V \cos \psi) \qquad (6)$$

Deriving flow velocity V' of the fluid 102 using Equations (3) and (6), it is expressed as Equation (7):

$$V' = L/2\cos\psi * ((1/Tf) - (1/Tr')) \quad (7)$$
$$= (C + V\cos\psi - (C + \Delta C - V\cos\psi))/2\cos\psi$$
$$= V - (\Delta C/2\cos\psi)$$

As expressed in Equation (7), the error of $-(\Delta C/2\cos\psi)$ occurs in the flow velocity V' of the fluid 102.

When trying to enhance S/N ratio by transmitting and receiving ultrasonic wave a plurality of times, period during which propagation periods Tf, Tr is measured is prolonged. Accordingly, as variation of speed C of sound affects for a longer period, variation $\Delta C$ of speed C of sound in the fluid 102 tends to increase. Therefore, error in flow velocity V' of the fluid 102 increases. Thus, in this embodiment, even if error in flow velocity V' of the fluid 102 increases owing to measuring the propagation period of ultrasonic wave Tf, Tr a plurality of times, flow velocity of the fluid is to be measured with changing order in which propagation periods Tr, Tf is measured, thereby canceling errors.

Method to measure flow velocity V of the fluid 102 by the flow velocity measuring unit 36 is described in detail below. In this embodiment, the flow velocity measuring unit 36 cancels measurement errors using flow velocity Va of the fluid 102 which is derived by measuring the propagation period Tr after measuring the propagation period Tf, and flow velocity Vb of the fluid 102 which is derived by measuring the propagation period Tf after measuring the propagation period Tr.

Specifically, the period measuring unit 34 initially measures a propagation period Tf1. The controlling unit 35 then switches the switches 33a and 33b, and subsequently the period measuring unit 34 measures a propagation period Tr1. The period measuring unit 34 subsequently measures a propagation period Tr2. The controlling unit 35 again switches the switches 33a and 33b and then the period measuring unit 34 measures a propagation period Tf2. The propagation periods Tf1, Tr1, Tr2 and Tf2 are input to the flow velocity measuring unit 36 and then the period measuring unit 34 calculates flow velocity V of the fluid 102.

Figure 2A:
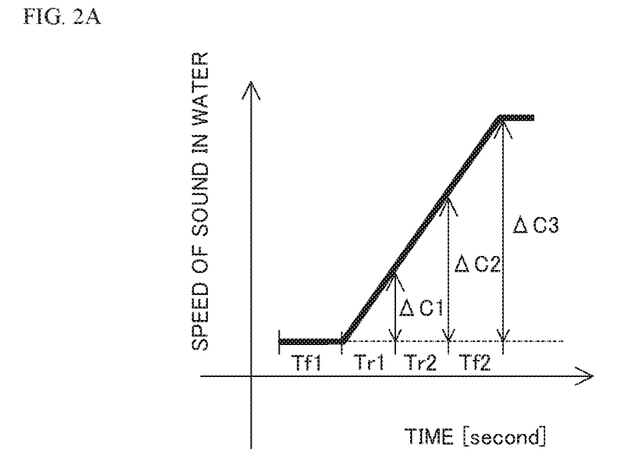
FIGS. 2A and 2B show illustrations of variation of speed of sound in fluid with progress in time.

Here, when speed of sound in the fluid 102 shifts from C to each of C+$\Delta C_1$, C+$\Delta C_2$, and C+$\Delta C_3$ as shown in FIG. 2A, propagation periods Tf1, Tr1, Tr2 and Tf2 are expressed as Equations (8) to (11), wherein, in FIG. 2A the horizontal and vertical axes are labeled to show time and speed of sound in water, respectively, showing shift of speed C of sound when water temperature varies during a predetermined period.

$$Tf1=L/(C+V\cos\psi) \quad (8)$$
$$Tr1=L/(C+\Delta C_1-V\cos\psi) \quad (9)$$
$$Tr2=L/(C+\Delta C_2-V\cos\psi) \quad (10)$$
$$Tf2=L/(C+\Delta C_3+V\cos\psi) \quad (11)$$

Here, if measurement intervals of propagation periods Tf1, Tr1, Tr2 and Tf2 which the period measuring unit 34 measures in the fluid 102 (as a water) are equal, each of amounts of variation in speed of sound in the fluid 102 for each measurement interval has the same value because each measurement interval is short. In the case of $\Delta C_1=\Delta C$, $\Delta C_2$ and $\Delta C_3$ can be expressed as $\Delta C_2=2\Delta C$ and $\Delta C_3=3\Delta C$, respectively.

When these expressions are substituted for Equations (8) to (11), propagation periods Tf1, Tr1, Tr2 and Tf2 are expressed as Equations (12) to (15):

$$Tf1=L/(C+V\cos\psi) \quad (12)$$
$$Tr1=L/(C+\Delta C-V\cos\psi) \quad (13)$$
$$Tr2=L/(C+2\Delta C-V\cos\psi) \quad (14)$$
$$Tf2=L/(C+3\Delta C+V\cos\psi) \quad (15)$$

Defining Va as flow velocity of the fluid 102 derived using propagation periods Tf1 and Tr1, and Vb as flow velocity of the fluid 102 derived using propagation periods Tr2 and Tf1, the flow velocities Va and Vb of the fluid 102 are solved using Equations (12) to (15), resulting in Equations (16) and (17):

$$Va = L/2\cos\psi * ((1/Tf1) - (1/Tr1)) \quad (16)$$
$$= ((C + V\cos\psi) - (C + \Delta C - V\cos\psi))/2\cos\psi$$
$$= V - (\Delta C/2\cos\psi)$$

$$Vb = L/2\cos\psi * ((1/Tf2) - (1/Tr1)) \quad (17)$$
$$= ((C + 3\Delta C + V\cos\psi) - (C + 2\Delta C - V\cos\psi))/2\cos\psi$$
$$= V + (\Delta C/2\cos\psi)$$

Using Equations (16) and (17), Flow velocity Va and flow velocity Vb of the fluid 102 are averaged to derive flow velocity V' of the fluid and then it is expressed as Equation (18):

$$V' = (Va + Vb)/2 \quad (18)$$
$$= ((V - (\Delta C/2\cos\psi)) + (V + (\Delta C/2\cos\psi))/2)$$
$$= V$$

As can be seen from above, error of $+(\Delta C/2\cos\psi)$ occurs when flow velocity Va of the fluid 102 is derived, while error of $-(\Delta C/2\cos\psi)$ occurs when flow velocity Vb of the fluid 102 is derived. Accordingly, averaging Va and Vb allows these errors to be canceled. In the fluid measuring apparatus 1 of this embodiment, the period measuring unit 34 measures propagation periods with changing order in which propagation periods Tf and Tr are measured, and then the flow velocity measuring unit 36 derives flow velocity Va and flow velocity Vb of the fluid 102 to cancel the errors therein, thereby allowing for deriving flow velocity V of the fluid with high precision. The flow rate measuring unit 37 calculates flow rate Q of the fluid 102 from above Equation (4) using flow velocity V of the fluid 102 which the flow velocity measuring unit 36 calculates.

Figure 2B:
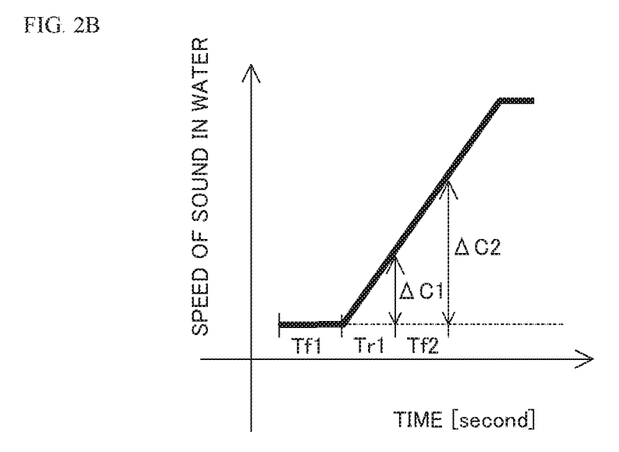

Alternatively, the period measuring unit 34 may alternately measure propagation periods in order such as Tf1, Tr1, Tf2, Tr2, . . . by switching, by the controlling unit 35, connecting paths through the switches 33a and 33b, and the flow velocity measuring unit 36 then may derive flow velocity Va of the fluid 102 from propagation periods Tf1 and Tr1 and derive flow velocity Vb of the fluid 102 from propagation periods Tr1 and Tf2. As shown in FIG. 2B, if amounts of variation in speed of sound in the fluid 102 corresponding to propagation periods Tr1, Tf2, . . . are $\Delta C$, $2\Delta C$, . . . , respectively, then propagation periods Tf1, Tr1 and Tf2 are expressed as Equations (19) to (21).

$$Tf1=L/(C+V\cos\psi) \quad (19)$$
$$Tr1=L/(C+\Delta C-V\cos\psi) \quad (20)$$
$$Tf2=L/(C+2\Delta C+V\cos\psi) \quad (21)$$

Defining Va as flow velocity of the fluid 102 derived using propagation periods Tf1 and Tr1, and Vb as flow velocity of the fluid 102 derived using propagation periods Tr1 and Tf2, Equations (22) and (23) are presented for these flow velocities Va and Vb.

$$Va = L/2\cos\psi * ((1/Tf1) - (1/Tr1)) \quad (22)$$
$$= ((C + V\cos\psi) - (C + \Delta C - V\cos\psi))/2\cos\psi$$
$$= V - (\Delta C/2\cos\psi)$$

$$Vb = L/2\cos\psi * ((1/Tf2) - (1/Tr1)) \quad (23)$$
$$= ((C + 2\Delta C + V\cos\psi) - (C + \Delta C - V\cos\psi))/2\cos\psi$$
$$= V + (\Delta C/2\cos\psi)$$

Using Equations (22) and (23), flow velocity Va and flow velocity Vb of the fluid 102 are averaged to derive flow velocity V' of the fluid and then it is expressed as Equation (24). Using common Tr1 to calculate flow velocity Va and flow velocity Vb allows errors to be canceled with number of measurements of propagation period fewer than number of measurements in the case of deriving flow velocity V of the fluid 102 from propagation periods Tf1, Tr1, Tr2 and Tf2 as described above.

$$V' = (Va + Vb)/2 \quad (24)$$
$$= ((V - (\Delta C/2\cos\psi)) + (V + (\Delta C/2\cos\psi)))/2$$
$$= V$$

Additionally, flow velocity Va of the fluid 102 may be derived from propagation periods Tf2 and Tr2, and flow velocity Vb of the fluid 102 may be derived from propagation periods Tr2 and Tf3 (the propagation period during which third ultrasonic wave propagates from the ultrasonic wave probe in the upstream side to the ultrasonic wave probe in the downstream side). In this manner, further measurements for flow velocity V of the fluid 102 can be consecutively performed with high precision.

Furthermore, the propagation period Tr is measured consecutively a plurality of times meanwhile the propagation period Tf is measured consecutively a plurality of times, allowing S/N ratio to be enhanced to improve measurement accuracy.

Figure 3A:
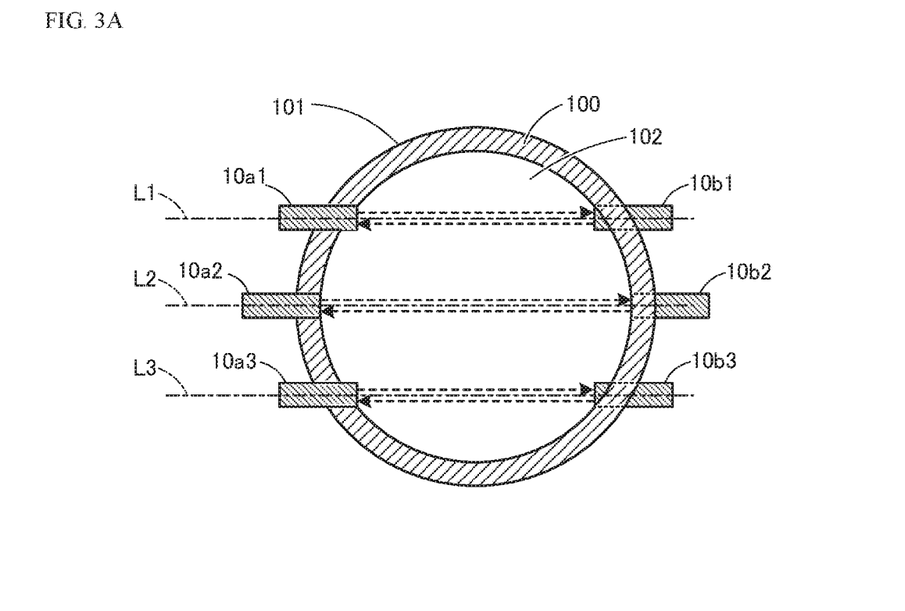
FIGS. 3A and 3B show views showing the plurality of pairs of the ultrasonic wave transmitting and receiving means according to the embodiment described above.
Figure 3B:
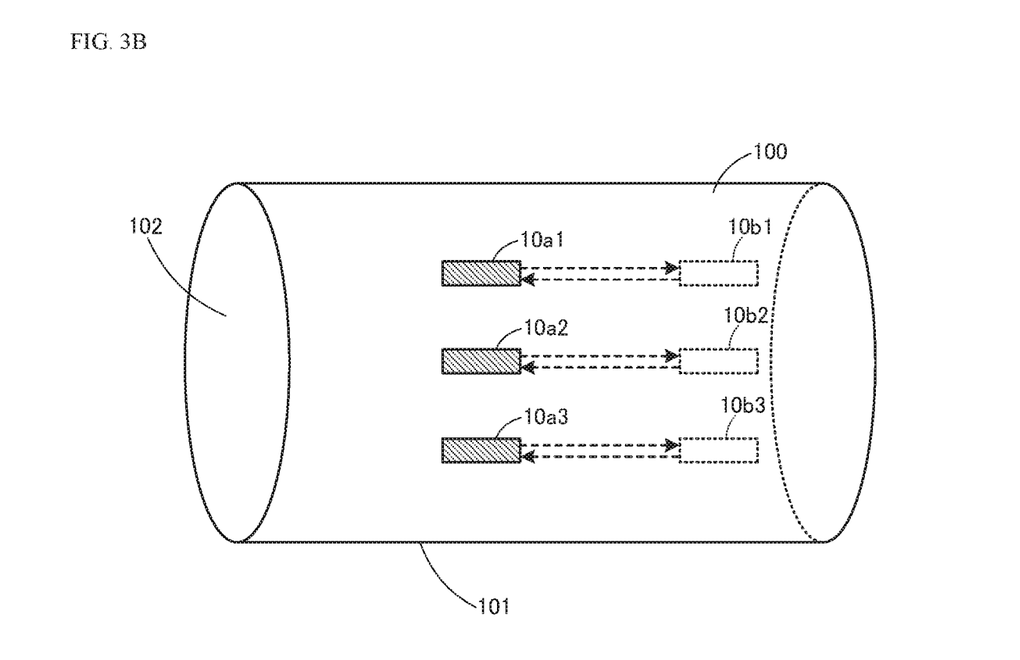

With reference to FIG. 3, method to measure using the plurality of pairs of ultrasonic wave probes is now described. FIG. 3 shows the views showing the plurality of pairs of the ultrasonic wave transmitting and receiving means according to the embodiment described above. FIG. 3A is the cross-section view of the pipe and FIG. 3B is side view of the pipe. As shown in FIG. 3, the fluid measuring apparatus 1 measures propagation periods Tr, Tf of ultrasonic wave along three measuring lines L1, L2 and L3 using three pairs of the ultrasonic wave probes 10a1 to 10a3 and 10b1 to 10b3. The ultrasonic wave probes 10a1, 10a2 and 10a3 are disposed in the upstream side of the pipe 100, and the ultrasonic wave probes 10b1, 10b2 and 10b3 are disposed in the downstream side of the pipe 100.

FIGS. 4 to 7 now shows simulation results relating to error of flow velocity of the fluid 102 which occurs when speed of sound in the fluid 102 varies, in the case of using the fluid measuring apparatus 1 having three pairs of the ultrasonic wave probes 10a1 to 10a3 and 10b1 to 10b3. Variation of speed C of sound was simulated, wherein temperature of water used as the fluid 102 varied at rate of one degree Celsius per second, for three seconds. The case where the fluid 102 had the flow velocity V=0 and the pipe 100 had the inner diameter of 50 mm, was simulated.

Figure 4A:
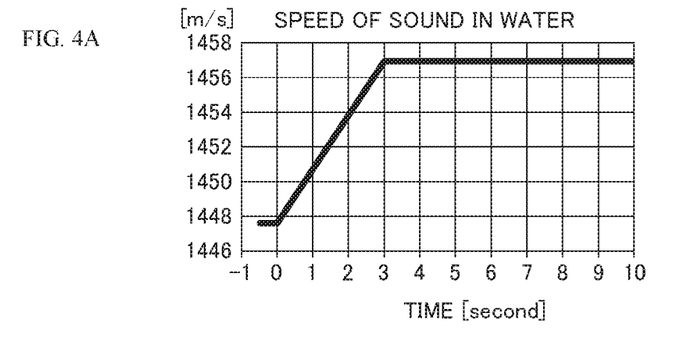
FIGS. 4A, 4B and 4C show views showing the result of measurement of fluid according to the comparative examples.
Figure 4B:
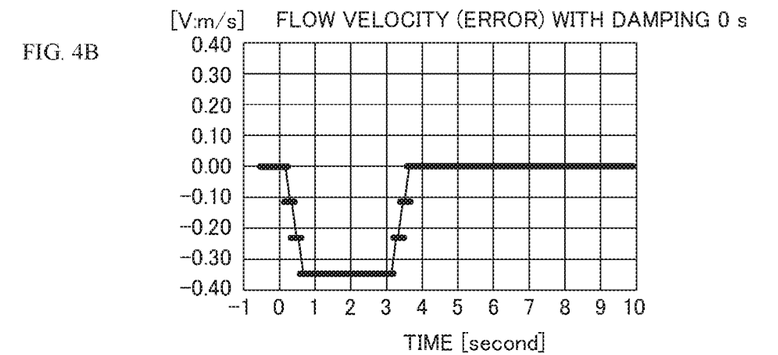
Figure 4C:
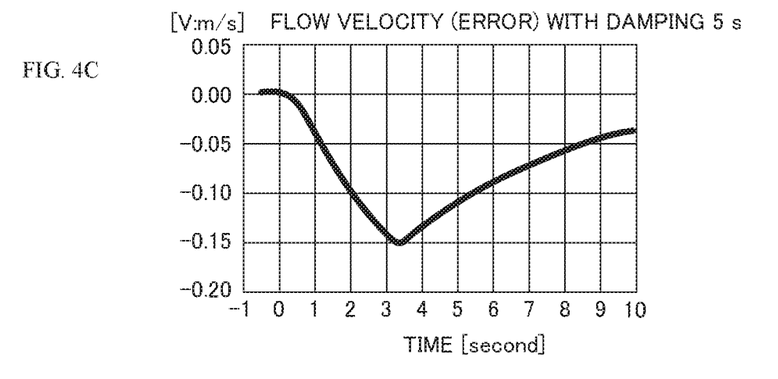

FIG. 4 shows the views showing the result of measurement of the fluid according to comparative examples: FIG. 4A shows the relation between time and variation of speed of sound in water; FIG. 4B shows the relation between time and the result of measurement of flow velocity of water; and FIG. 4C shows the output result when performing a damping operation on the result of measurement of FIG. 4B. In FIG. 4B, flow velocity of water was measured in order of the measuring line L1, the measuring line L2, the measuring line L3, the measuring line L1, the measuring line L2, the measuring line L3, . . . . Along each measuring line, initially the propagation period Tf was measured and then the propagation period Tr was measured. Flow velocity Va of the fluid 102 was adopted to derive flow velocity V of the fluid 102. Flow velocity Vb was not adopted. Amount of weighting of each of the measuring lines L1, L2 and L3 was ⅓ with the measuring lines L1, L2 and L3 weighted equally.

In FIG. 4C, the damping operation with time constant of five seconds was performed on the result of measurement of FIG. 4B, wherein the damping operation was a first-order delay operation which can provide the effect same as that to be provided when a first-order low-path filter with time constant of five seconds is passed through. This has effect of eliminating a high-frequency component in the result of measurement of flow velocity V of the fluid 102 to stabilize the result of measurement with simple processing. In this case, the fluid measuring apparatus 1 would be provided with an elimination processing unit (not shown) to perform damping process. In addition, in FIG. 4A, the horizontal and vertical axes are labeled to show time and speed C of sound in water, respectively, in FIG. 4B, the horizontal and vertical axes are labeled to show time and the result of measurement of flow velocity V of water, respectively, and in FIG. 4C, the horizontal and vertical axes are labeled to show time and the result of measurement of flow velocity V of water on which damping process is performed, respectively.

As shown in FIG. 4A, Speed C of sound in water rises from the time of 0 second, to the time of 3 second at which water temperature commences to vary, and after the time of 3 second, it is constant. As shown in FIG. 4B, from the time of 0 second, to the time of 3 second at which water temperature commences to vary, the error with its maximum of the absolute value less than 0.35 m/s occurs, wherein this error indicates the deviation of flow velocity V=0 of water from the true value. As shown in FIG. 4C, although damping operation is performed on the result of measurement of FIG. 4B, error is not reduced, the error with its maximum of the absolute value less than 0.15 m/s occurring.

Figure 5A:
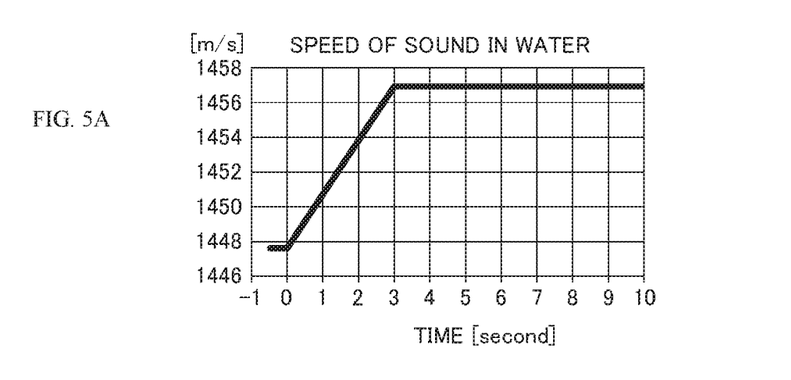
FIGS. 5A, 5B and 5C show views showing the result of measurement of fluid according to the embodiment described above.
Figure 5B:
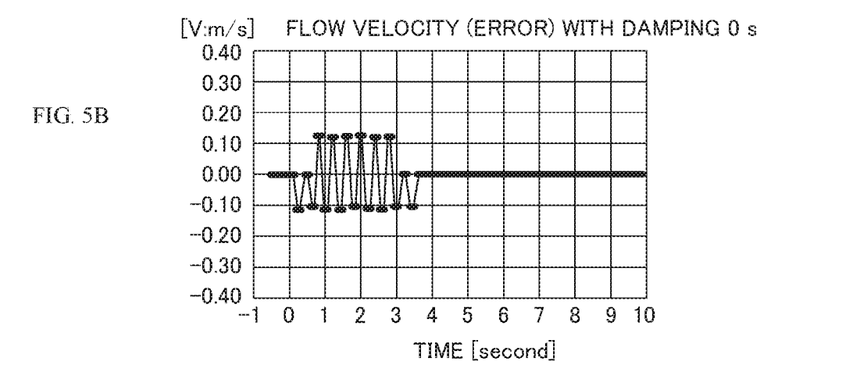
Figure 5C:
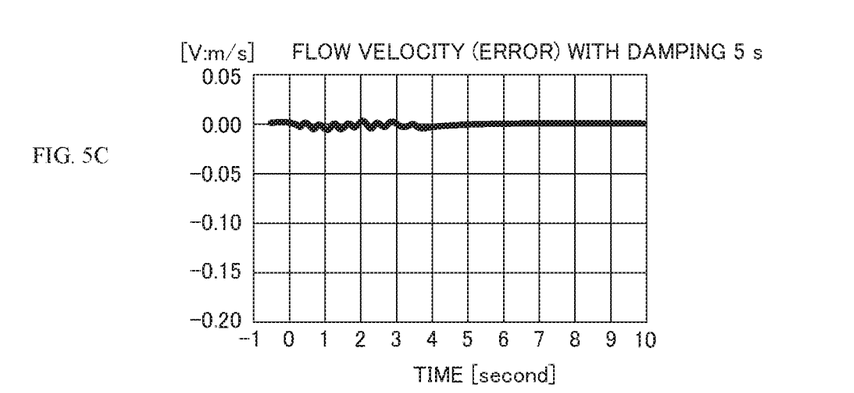

FIG. 5 shows the views showing the result of measurement of the fluid according to the embodiment described above: FIG. 5A shows the relation between time and variation of speed of sound in water; FIG. 5B shows the relation between time and the result of measurement of flow velocity of water; and FIG. 5C shows the output result when performing the damping operation on the result of measurement of FIG. 5B. In FIG. 5B, flow velocity of water was measured in order of the measuring line L1, the measuring line L2, the measuring line L3, the measuring line L1, the measuring line L2, the measuring line L3, . . . . For each of the measuring lines L1, L2 and L3, order in which propagation periods Tf and Tr were to be measured was changed. Along each of the measuring lines L1, L2 and L3, sequentially, flow velocity Va and flow velocity Vb of the fluid 102 were alternately measured. Amount of weighting of each of the pair 21 of the ultrasonic wave probes, the pair 22 of the ultrasonic wave probes, and the pair 23 of the ultrasonic wave probes was ⅓ with the pairs weighted equally. In FIG. 5C, the damping operation with time constant of five seconds was performed on the result of measurement of FIG. 5B. The value of the vertical and horizontal axes in FIGS. 5A to 5C are labeled like FIGS. 4A to 4C.

As shown in FIG. 5B, the maximum of the absolute value of the error is reduced from 0.35 m/s to 0.12 m/s in comparison with FIG. 4B. When the damping operation is performed on the result of measurement of FIG. 5B, the maximum of the absolute value of the error is significantly reduced from 0.15 m/s to 0.01 m/s in comparison with FIG. 5C, as shown in FIG. 5C. As can be seen from above, measurement of flow velocity Va and flow velocity Vb using the plurality of pairs of the ultrasonic wave probes $10a1$ to $10a3$ and $10b1$ to $10b3$ allows errors to be canceled and thus measurement error to be reduced.

Figure 6A:
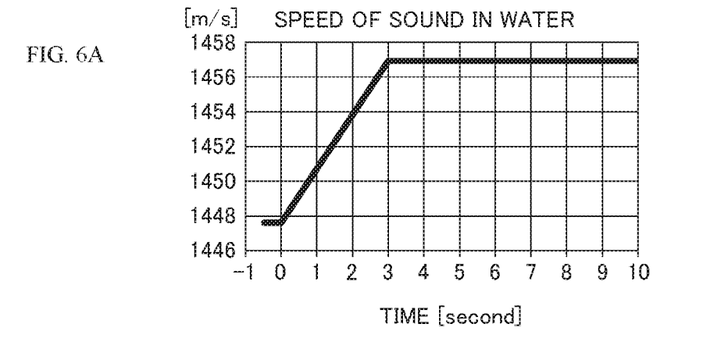
FIGS. 6A, 6B and 6C show views showing the result of measurement of fluid according to the embodiment described above.
Figure 6B:
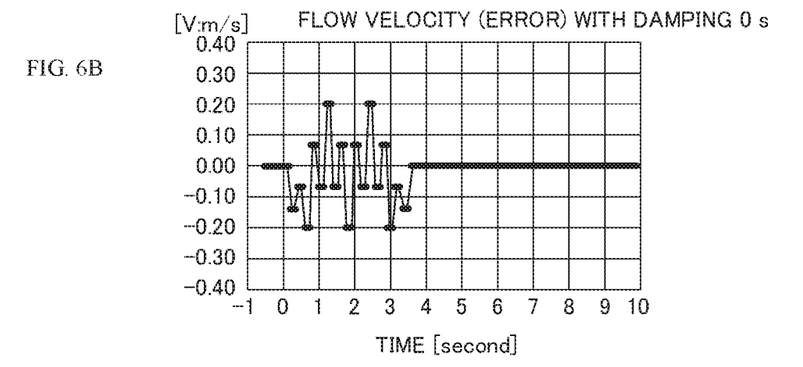
Figure 6C:
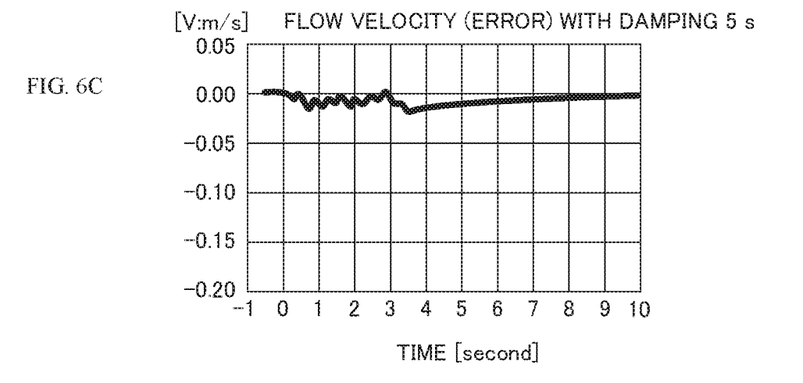

Now, with reference to FIG. 6, method to measure wherein the measuring lines are not weighted equally is described. FIG. 6 shows the views showing the result of measurement of the fluid according to the embodiment described above: FIG. 6A shows the relation between time and variation of speed of sound in water; FIG. 6B shows the relation between time and the result of measurement of flow velocity of water; and FIG. 6C shows the output result when performing the damping operation on the result of measurement of FIG. 6B. Each of amounts of weighting of the measuring lines L1 and L3 is set to 0.4, amount of weighting of the measuring line L2 is set to 0.2, and weighting of three measuring lines is set so that the sum of amounts of weighting of the measuring lines is 1. In FIG. 6B, flow velocity of water was measured in order of the measuring line L1, the measuring line L2, the measuring line L3, the measuring line L1, the measuring line L2, the measuring line L3, . . . . For each of the measuring lines L1, L2 and L3, order in which propagation periods Tf and Tr were to be measured was changed. Along each of the measuring lines L1, L2 and L3, sequentially, flow velocity Va and flow velocity Vb of the fluid 102 were alternately measured. In FIG. 6C, the damping operation with time constant of five seconds was performed on the result of measurement of FIG. 6B. The value of the vertical and horizontal axes in FIGS. 6A to 6C are labeled like FIGS. 4A to 4C. In addition, as for weighting of each of the measuring lines L1, L2 and L3, it is known that flow velocity distribution varies as flow velocity varies. Amounts of weighting experimentally, empirically or theoretically derived in advance are used so that influence of that variation is canceled. That case where each of amounts of weighting of the measuring lines L1 and L3 is set to 0.4 and amount of weighting of the measuring line L2 is set to 0.2, is one example of this. Generally, weighting changes as alignment of the measuring lines changes.

As shown in FIG. 6B, the maximum of the absolute value of the error increased from 0.12 m/s to 0.21 m/s in comparison with FIG. 5B. When the damping operation was performed on the result of measurement of FIG. 6B, the maximum of the absolute value of the error slightly increased from 0.01 m/s to 0.02 m/s in comparison with FIG. 5C, as shown in FIG. 6C. As can be seen from above, when each of the measuring lines L1, L2 and L3 are weighted, although the error is improved in comparison with the comparative examples of FIG. 4, the error slightly increases in comparison with FIG. 5. When weighting not equally as described above, advantageously flow velocity Va and flow velocity Vb are allocate to each of the measuring lines L1, L2 and L3 based on weighting.

Figure 7A:
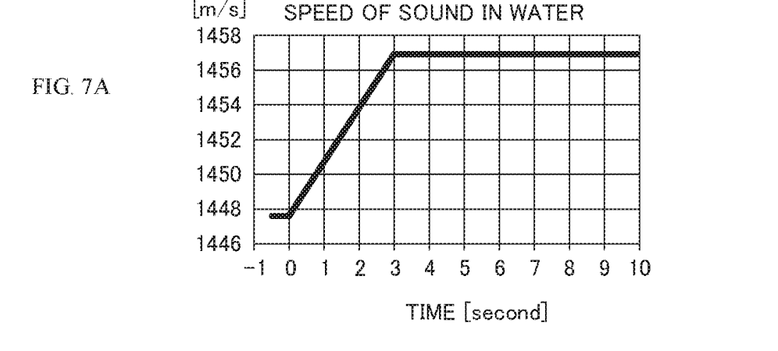
FIGS. 7A, 7B and 7C show views showing the result of measurement of fluid according to the embodiment described above.
Figure 7B:
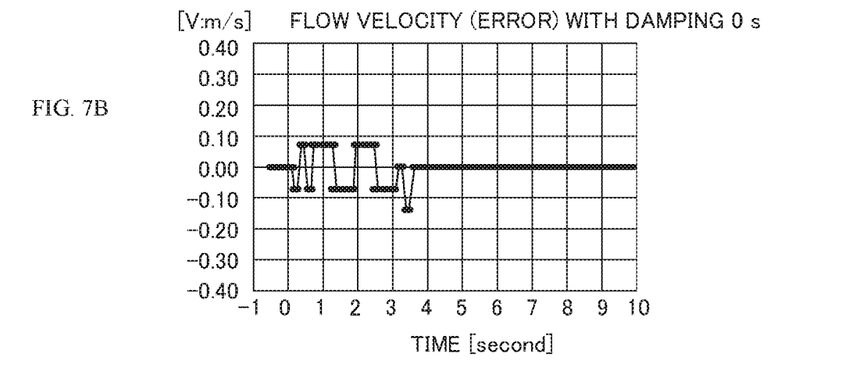
Figure 7C:
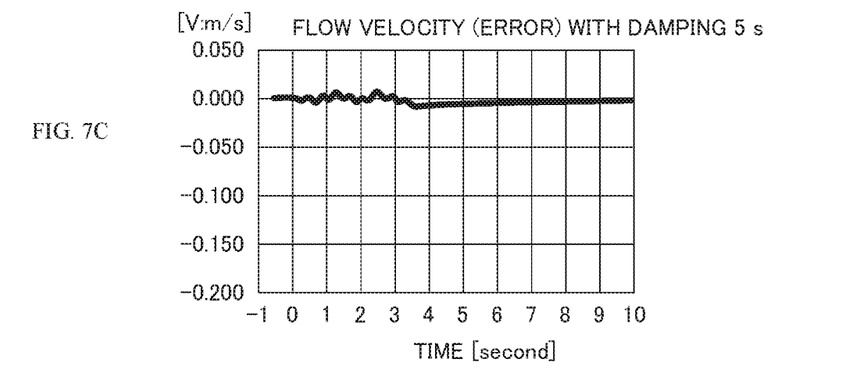

Now, with reference to FIG. 7, the case where flow velocity Va and flow velocity Vb are allocated to each measuring line based on weighting of the measuring lines L1, L2 and L3 is described. FIG. 7 shows the views showing the result of measurement of the fluid according to the embodiment described above: FIG. 7A shows the relation between time and variation of speed of sound in water; FIG. 7B shows the relation between time and the result of measurement of flow velocity of water; and FIG. 7C shows the output result when performing the damping operation on the result of measurement of FIG. 7B. Each of amounts of weighting of the measuring lines L1 and L3 is set to 0.4, amount of weighting of the measuring line L2 is set to 0.2, and weighting of three measuring lines is set so that the sum of amounts of weighting of the measuring lines is 1. In FIG. 7B, flow velocity of water was measured in order of the measuring line L1, the measuring line L2, the measuring line L3, the measuring line L1, the measuring line L2, the measuring line L3, . . . . Flow velocity of the fluid 102 which were to be measured along the measuring line L1 with the larger amount of weighting, was set to Va. Flow velocity of the fluid 102 which were to be measured along the measuring line L3 with the larger amount of weighting as well, was set to Vb in contrast to the case of the measuring line L1. Flow velocity of the fluid 102 which were to be measured along the measuring line L2 with the smallest amount of weighting, was set so as to alternate flow velocity Va and flow velocity Vb every measurement: that is, the measurement was performed in order of the measuring line L 1 (Va), the measuring line L2 (Va), the measuring line L3 (Vb), the measuring line L1 (Va), the measuring line L2 (Vb), the measuring line L3 (Vb), the measuring line L1 (Va), the measuring line L2 (Va), . . . . In FIG. 7C, the damping operation with time constant of five seconds was performed on the result of measurement of FIG. 7B. The vertical and horizontal axes in FIGS. 7A to 7C are labeled like FIGS. 4A to 4C.

As shown in FIG. 7B, the maximum of the absolute value of the error was reduced from 0.21 m/s to 0.14 m/s in comparison with FIG. 6B. When the damping operation was performed on the result of measurement of FIG. 6B, the maximum of the absolute value of the error was reduced from 0.02 m/s to 0.01 m/s in comparison with FIG. 6C, as shown in FIG. 7C. As can be seen from above, when each of the measuring lines L1, L2 and L3 are weighted, flow velocities Va and Vb of the fluid 102 which were to be measured along each of the measuring lines L1, L2 and L3 are allocated based on weighting, allowing measurement errors to be reduced.

Besides, when allocation for the measuring lines is performed based on weighting, a setting sequence may be repeated, which includes: setting flow velocity which is to be measured by the pair of ultrasonic wave probes with the largest amount of weighting, to one of flow velocity Va and flow velocity Vb; and for pairs with the second largest amount of weighting and following ones, performing consecutively twice a setting of flow velocity which is to be measured, to the other of the flow velocity Va and the flow velocity Vb, and subsequently performing consecutively twice a setting to the one of the flow velocity Va and the flow velocity Vb. In other words, flow velocity which is to be measured by the pair with the largest amount of weighting is set to Va or Vb; flow velocity which is to be measured by each of the pairs with the second and third largest amounts of weighting is set to Va or Vb which is different from that flow velocity Va or Vb set for the pair with the largest amount of weighting; flow velocity which is to be measured by each of the pairs with the fourth and fifth largest amounts of weighting is set to Va or Vb which is the same as that flow velocity Va or Vb set for the pair with the largest amount of weighting; and flow velocity which is to be measured by each of the pairs with the sixth and seventh largest amounts of weighting is set to Va or Vb which is different from that flow velocity Va or Vb set for the pair with the largest amount of weighting. To set in accordance with such sequence allows effect of reduction to error to enhance.

Alternatively, flow velocities which are to be measured by each of pairs of ultrasonic wave probes may be set in order of amounts of weighting so as, alternately, to be set to flow velocity Va and be set to flow velocity Vb, that is, flow velocity which is to be measured by the pair with the largest amount of weighting is set to flow velocity Va or Vb, flow velocity which is to be measured by the pair with the second largest amount of weighting is set to Va or Vb which is different from that flow velocity Va or Vb set for the pair with the largest amount of weighting, flow velocity which is to be measured by the pair with the third largest amount of weighting is set to Va or Vb which is the same as that flow velocity Va or Vb set for the pair with the largest amount of weighting, and flow velocity which is to be measured by the pair with the fourth largest amount of weighting is set to Va or Vb which is different from that flow velocity Va or Vb set for the pair with the largest amount of weighting. To set in accordance with such sequence also allows effect of reduction to error to be provided. Also, flow velocity Va and flow velocity Vb may be alternately set to flow velocity which is to be measured by the pair of ultrasonic wave probes with the smallest amount of weighting, thereby providing higher effect of reduction to error.

As discussed above, in the fluid measuring apparatus 1 of this embodiment, even if an error occurs in a result of measurement of flow velocity V of the fluid 102 owing to variation in speed C of sound in the fluid 102, to measure flow velocity Va and flow velocity Vb with changing order in which propagation periods Tf and Tr are measured, allows sign of error occurring in flow velocity Va to be opposed to sign of error occurring in flow velocity Vb. This allows these errors to be canceled using flow velocity Va and flow velocity Vb, so as to allow S/N ratio to be enhanced by measuring propagation periods Tf and Tr of ultrasonic wave a plurality of times, thereby measuring flow velocity V of the fluid 102 with high precision.

The invention is also not limited to the embodiments described above, which can be variously modified to practice. In the embodiments described above, sizes and/or shapes as illustrated in the attached drawings are not limited to those of the embodiments, and can be modified appropriately as far as effect of the invention is provided. For any other matters, modifications could be made appropriately without departing from objectives of the invention, to practice.

The features in the embodiments described above are summarized below.

A fluid measuring apparatus of the invention includes: at least one pair of ultrasonic wave transmitting and receiving means which transmits and receives ultrasonic wave to and from a fluid flowing in a pipe; a period measuring unit which measures a propagation period of ultrasonic wave transmitted and received by the ultrasonic wave transmitting and receiving means; and a flow velocity measuring unit which derives flow velocity of the fluid from the propagation period of ultrasonic wave measured by the period measuring unit; wherein: one of the pair of ultrasonic wave transmitting and receiving means is disposed in upstream of the pipe, and the other is disposed in downstream of the pipe; the period measuring unit measures a first propagation period during which ultrasonic wave propagates from the ultrasonic wave transmitting and receiving means in an upstream side to the ultrasonic wave transmitting and receiving means in a downstream side, and a second propagation period during which ultrasonic wave propagates from the ultrasonic wave transmitting and receiving means in the downstream side to the ultrasonic wave transmitting and receiving means in the upstream side; and the flow velocity measuring unit derives flow velocity of the fluid so as to cancel errors using flow velocity Va which is derived by measuring the second propagation period after measuring the first propagation period, and flow velocity Vb which is derived by measuring the first propagation period after measuring the second propagation period.

According to this arrangement, even if an error occurs in a result of measurement of flow velocity of the fluid owing to variation in speed of sound in the fluid, to measure the flow velocity Va and the flow velocity Vb with changing the order in which propagation periods are measured, allows sign of the error occurring in the flow velocity Va to be opposed to sign of the error occurring in the flow velocity Vb. This allows these errors to be canceled using the flow velocity Va and the flow velocity Vb, so as to allow S/N ratio to be enhanced by measuring propagation periods of ultrasonic wave a plurality of times, thereby measuring flow velocity of the fluid with high precision.

In the fluid measuring apparatus of the invention, the period measuring unit may alternately measure first and second propagation periods; and the flow velocity measuring unit may derive the flow velocity Va from the first propagation period and the second propagation period in consecutive relation to each other, and derive the flow velocity Vb from that second propagation period and first propagation period following it. This arrangement can reduce number of measurements of the propagation period of ultrasonic wave.

In the fluid measuring apparatus of the invention, the period measuring unit may measure: a plurality of times, the propagation period during which ultrasonic wave propagates from the ultrasonic wave transmitting and receiving means in the upstream side to the ultrasonic wave transmitting and receiving means in the downstream side, to derive the first propagation period; and a plurality of times, the propagation period during which ultrasonic wave propagates from the ultrasonic wave transmitting and receiving means in the downstream side to the ultrasonic wave transmitting and receiving means in the upstream side, to derive the second propagation period. This arrangement can enhance S/N ratio and also enhance measurement accuracy.

In the fluid measuring apparatus of the invention, the flow velocity measuring unit may include a plurality of pairs of the ultrasonic wave transmitting and receiving means, in each of the pairs, the first propagation period and the second propagation period may be measured, and in each of the pairs, sequentially, the flow velocity Va and the flow velocity Vb may be alternately measured. This arrangement can cancel the errors by the measuring flow velocity Va and flow velocity Vb using the plurality of pairs of the ultrasonic wave transmitting and receiving means.

In the fluid measuring apparatus of the invention, each of the plurality of pairs of ultrasonic wave transmitting and receiving means may be weighted, flow velocities which are to be measured by each of the pairs may be set, based on their respective amounts of weighting, to one of the flow velocity Va and the flow velocity Vb, and flow velocity of the fluid may be derived with weight addition. This arrangement can enhance measurement accuracy by measuring flow velocity of the fluid with each of the pairs of the ultrasonic wave transmitting and receiving means weighted.

In the fluid measuring apparatus of the invention, a setting sequence may be repeated, the setting sequence comprising: setting flow velocity which is to be measured by the pair of ultrasonic wave transmitting and receiving means with the largest amount of weighting, to one of the flow velocity Va and the flow velocity Vb; and for pairs with the second largest amount of weighting and following ones, performing consecutively twice a setting of flow velocity which is to be measured, to the other of the flow velocity Va and the flow velocity Vb, and subsequently performing consecutively twice a setting to the one of the flow velocity Va and the flow velocity Vb. This arrangement can enhance effect of reduction of error by setting flow velocities of the fluid which are to be measured by each of the pairs of the ultrasonic wave transmitting and receiving means in order of weighting in a defined sequence.

In the fluid measuring apparatus of the invention, flow velocities which are to be measured by each of the pairs of ultrasonic wave transmitting and receiving means may be set in order of the amounts of weighting alternately to the flow velocity Va and the flow velocity Vb. This arrangement can enhance effect of reduction of error by setting flow velocities of the fluid which are to be measured by each of the pairs of ultrasonic wave transmitting and receiving means in order of weighting in a defined sequence.

In the fluid measuring apparatus of the invention, the flow velocity Va and the flow velocity Vb may be alternately set to the flow velocity which is to be measured by the pair of ultrasonic wave transmitting and receiving means with the smallest amount of weighting. This arrangement can enhance effect of reduction of error.

The fluid measuring apparatus of the invention may include an elimination processing unit which eliminates a high-frequency component from flow velocity of the fluid derived by the flow velocity measuring unit. This arrangement can stabilize the result of measurement to reduce error in the result of measurement of flow velocity of the fluid.

In the fluid measuring apparatus of the invention, the high-frequency component may be eliminated with damping process. This arrangement can stabilize the result of measurement with a simple processing to reduce error in the result of measurement of flow velocity of the fluid.

What is claimed is:

1. A fluid measuring apparatus, comprising: a plurality of pairs of ultrasonic wave probes, each ultrasonic wave probe being configured to transmit and receive ultrasonic waves to and from fluid flowing in a pipe, wherein in each of the pairs of the ultrasonic wave probes, one ultrasonic wave probe is disposed more upstream than the other; a processor; and a non-transitory storage medium containing program instructions therein, execution of which by the processor causes the fluid measuring apparatus to provide functions of: a period measuring unit that measures, for each of the pairs of the ultrasonic wave probes, a first propagation period during which an ultrasonic wave propagates from one ultrasonic wave probe thereof to the other ultrasonic wave probe thereof, and a second propagation period during which an ultrasonic wave propagates from the other ultrasonic wave probe thereof to the one ultrasonic wave probe thereof; and a flow velocity measuring unit that derives a flow velocity of the fluid by cancelling errors in a first flow velocity that is derived by measuring the second propagation period after measuring the first propagation period, and a second flow velocity that is derived by measuring the first propagation period after measuring the second propagation period, wherein the first propagation period and the second propagation period are measured in each of the pairs of ultrasonic wave probes; and the first flow velocity and the second flow velocity are alternately derived sequentially in each of the pairs of ultrasonic wave probes.

2. The fluid measuring apparatus according to claim 1, wherein:
   the period measuring unit alternately measures the first propagation period and the second propagation period; and
   the flow velocity measuring unit
      derives the first flow velocity from a measured first propagation period and a measured second propagation period that are consecutive to each other, and
      derives the second flow velocity from a measured second propagation period and a measured first propagation period subsequent thereto.

3. The fluid measuring apparatus according to claim 1, wherein the period measuring unit, for each of the pairs of the ultrasonic wave probes,
   repeatedly measures a propagation period during which the ultrasonic wave propagates from the one ultrasonic wave probe to the other ultrasonic wave probe, to derive the first propagation period; and
   repeatedly measures a propagation period during which the ultrasonic wave propagates from the other ultrasonic wave probe to the one ultrasonic wave probe, to derive the second propagation period.

4. The fluid measuring apparatus according to claim 1, wherein the execution of the program instructions by the processor causes the fluid measuring apparatus to eliminate a high-frequency component from the flow velocity of the fluid derived by the flow velocity measuring unit.

5. The fluid measuring apparatus according to claim 4, wherein the high-frequency component is eliminated by a damping process.

6. A fluid measuring apparatus, comprising: a plurality of pairs of ultrasonic wave probes, each ultrasonic wave probe being configured to transmit and receive ultrasonic waves to and from fluid flowing in a pipe, wherein in each of the pairs of the ultrasonic wave probes, one ultrasonic wave probe is disposed more upstream than the other; a processor; and a non-transitory storage medium containing program instructions therein, execution of which by the processor causes the fluid measuring apparatus to provide functions of: a period measuring unit that measures, for each of the pairs of the ultrasonic wave probes, a first propagation period during which an ultrasonic wave propagates from one ultrasonic wave probe thereof to the other ultrasonic wave probe thereof, and a second propagation period during which an ultrasonic wave propagates from the other ultrasonic wave probe thereof to the one ultrasonic wave probe thereof; and a flow velocity measuring unit that derives a flow velocity of the fluid by cancelling errors in a first flow velocity that is derived by measuring the second propagation period after measuring the first propagation period, and a second flow velocity that is derived by measuring the first propagation period after measuring the second propagation period, wherein the first propagation period and the second propagation period are measured in each of the pairs of ultrasonic wave probes; and each of the plurality of the pairs of ultrasonic wave probes has a weight assigned thereto, flow velocities which are to be measured by each of the pairs are set, based on their respective amounts of weighting, to one of the first flow velocity and the second flow velocity; and flow velocity of the fluid is derived with weight addition.

7. The fluid measuring apparatus according to claim 5, wherein
a setting sequence is repeated, and
the setting sequence includes:
setting flow velocity which is to be measured by the pair of ultrasonic wave probes with the largest amount of weighting, to one of the first flow velocity and the second flow velocity; and
for pairs with the second largest amount of weighting and following ones, performing consecutively twice a setting of flow velocity which is to be measured, to the other of the first flow velocity and the second flow velocity, and subsequently performing consecutively twice a setting to the one of the first flow velocity and the second flow velocity.

8. The fluid measuring apparatus according to claim 5, wherein
flow velocities measured by each of the pairs of ultrasonic wave probes are set, in an order of amounts of the weights, alternately to the first flow velocity and the second flow velocity.

9. The fluid measuring apparatus according to claim 5, wherein
the first flow velocity and the second flow velocity are alternately set to flow velocity which is to be measured by the pair of ultrasonic wave probes with a smallest amount of the weights.

\* \* \* \* \*